United States Patent [19]
Cousin
[11] 4,007,327
[45] Feb. 8, 1977

[54] APPARATUS FOR SELECTIVELY ALTERING IMAGE DATA FOR CRT DISPLAY IN ORDER TO FACILITATE IMAGE ANALYSIS

[75] Inventor: Alain Cousin, La Garenne Colombes, France

[73] Assignee: Compagnie Industrielle des Telecommunications Cit-Alcatel, Paris, France

[22] Filed: July 30, 1975

[21] Appl. No.: 600,480

[52] U.S. Cl. ........................ 358/160; 178/DIG. 34; 358/22; 358/37

[51] Int. Cl.² .................... H04N 5/22; H04N 9/535

[58] Field of Search ............... 178/DIG. 8, DIG. 16, 178/6, DIG. 3, 7.1, 7.3 R, 7.3 DC, DIG. 12, 6.8, 7.5 D, 7.3 D, DIG. 34, DIG. 36; 358/32, 27, 22

[56] References Cited

UNITED STATES PATENTS

| | | | |
|---|---|---|---|
| 3,277,318 | 10/1966 | Bedford | 178/DIG. 16 |
| 3,341,654 | 9/1967 | Pay et al. | 178/DIG. 16 |
| 3,812,289 | 5/1974 | Avins | 178/DIG. 12 |
| 3,878,325 | 4/1975 | Cecchin et al. | 178/DIG. 12 |

*Primary Examiner*—John C. Martin
*Attorney, Agent, or Firm*—Haseltine, Lake & Waters

[57] ABSTRACT

Apparatus for treatment of luminance and/or color data included in information representative of an image to be displayed in a visual display system, comprising a comparator for comparing the data with at least one reference datum defined upon a scale of level possible variations and a device for switching the levels of the data according to the positioning in relation to each reference datum to lead to a precise analysis of the displayed image.

3 Claims, 6 Drawing Figures

APPARATUS FOR SELECTIVELY ALTERING IMAGE DATA FOR CRT DISPLAY IN ORDER TO FACILITATE IMAGE ANALYSIS

The present invention relates to an apparatus for treatment of information representative of an image in a cathode unit of a visual display system.

It is well known that in display systems such information is received in image storing memories which are read off cyclically to ensure that a permanent image is maintained in the course of display. The appropriate tracing of the image is obtained by suitable instructions for deflecting the beam of the cathode unit as a function of the successive positioning data contained in the information entered in the storage memories or implicitly defined by a scanning of television-type. The luminances and/or colours of the successive points or elements of the image are also obtained by appropriate controls of the cathode unit as a function of the corresponding data contained in the information entered in the storage memories. The variation in the colours and/or luminances between the elements or groups of elements composing the image ensures their differentation and allows to effect, by simple visual examination, a preliminary classification of these elements in several categories to define the characteristics of the image.

In the cases, however, where the displayed image is highly complex the possible variations of luminance and/or of colour are not always sufficient to lead to a precise analysis of the displayed image.

It is precisely the object of the present invention to make possible such a precise analysis of the characteristics of an image displayed on the screen of a visualizing system, by having recourse to a processing of the information defining the image.

According to the present invention there is provided an apparatus for processing information representative of an image to be displayed in a cathode unit of a visual display system, the tracing of the successive elements of the image being obtained from primary data, and the successive elements being defined by secondary data contained in the information and allowing them to be differentiated, the apparatus comprising a first means of comparator type for working out a primary signal characterizing the positioning of the secondary data received in succession in relation to zones of levels defined on a scale of variation of levels of these secondary data, and a means for switching the levels of the secondary data, and assigning different levels to the secondary data according to the value of the primary signal.

According to a further feature of the invention, the said means for switching levels has an input switch controlled by a means defining the modes of processing, and an output multiplier capable of expanding over the entire scale of variation a zone selected among the zones defined in the said scale of variation, according to a defined mode of processing, so as to assign to the data of this selected zone an output level having a determined ratio k to its input level, the said ratio k being the factor of expansion of the zone selected from the whole scale, and to assign to the data external to this selected zone the same constant pre-established level applied to an input of the said switch from the said means defining the processing modes.

The invention will now be described in more detail by way of example only, with reference to the accompanying drawings in which.

Figure 1:
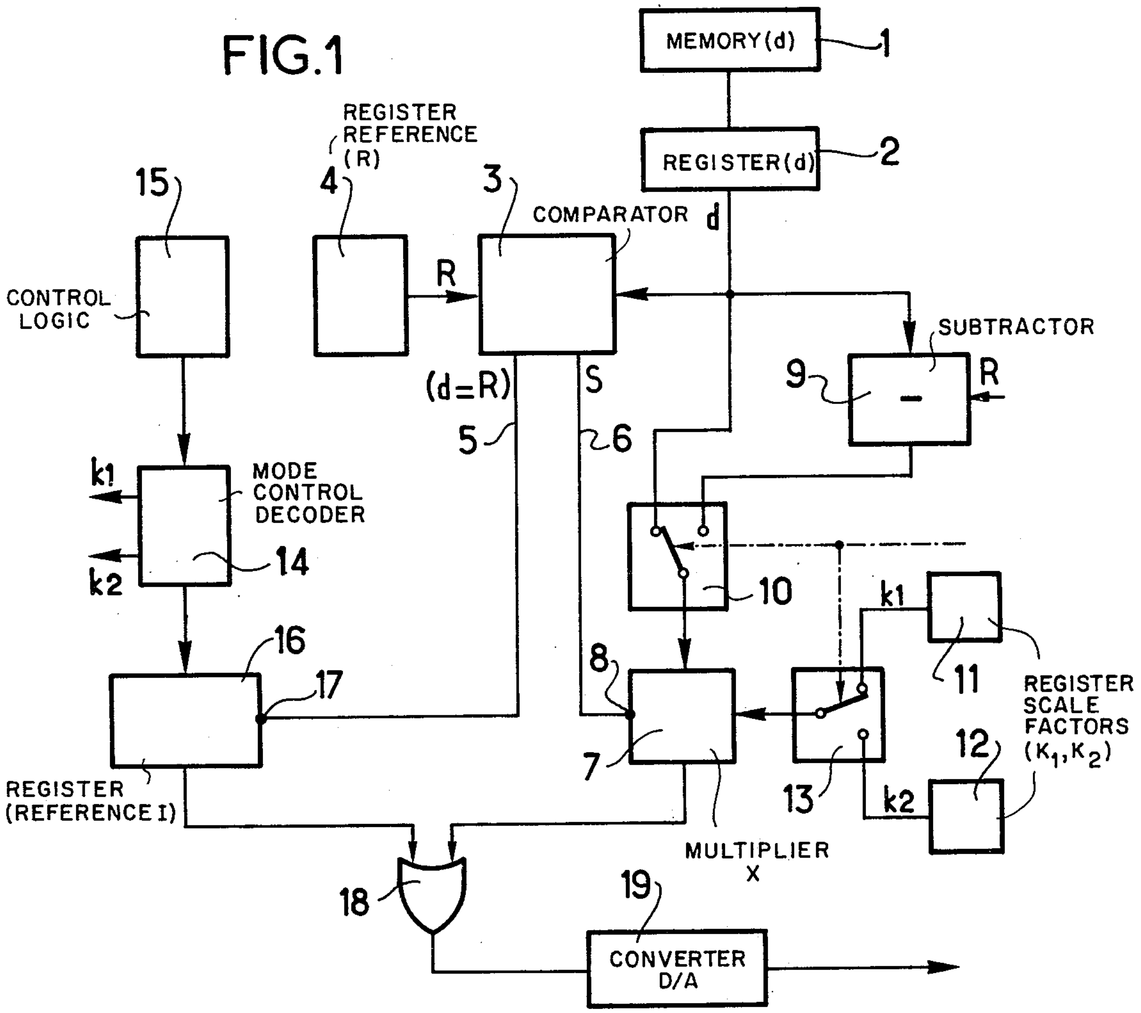
FIG. 1 shows an apparatus ensuring a simple processing of the information for visual presentation.

In FIG. 1, 1 represents a memory (bank) where the luminance data, *d*, are stored in binary form, relating to the successive points that compose an image as it is being dealt with by the visualization system. These luminance data *d* are successively delivered at the output of a register 2 to the input of an assembly that ensures their processing in the course of presentation of the image. The data *d* relating to the successive points of the image are all delivered in parallel at the output of the register 2.

The data *d* allow to differentiate between the successive elements or groups of elements of the image, whose tracing are obtained from the positioning data picked up at the same time as the corresponding *d* data by appropriate control means for deflection of the beam of the cathode unit, as is well known in visualizing systems.

The successive *d* data are fed to a comparator 3, which also receives a reference datum R, in binary form, previously committed to memory in a register 4. The comparator 3 delivers at its first output 5 a first signal characterizing equality between the received *d* datum and the reference R ($d=R$). At a second output 6 it delivers the sign S of the difference *d*-R; thus this sign S of the difference *d*-R defines a second signal characterizing the presence at the input of the comparator 3 of a datum *d* lower than the reference R ($d<R$) or of a datum *d* higher than the reference R ($d>R$). The signal S coming from the comparator 3 is fed into a multiplier 7 at a control input 8, in order to make it active. This multiplier 7 receives from the register 2 either the datum *d* or the difference *d*-R obtained in a subtractor 9 through a first control selector 10. In addition, the multiplier 7 receives either a first coefficient of multiplication k1 from a first register 11 or a second coefficient of multiplication k2 from a second register 12 through a second control selector 13. The coefficients k1 and k2 are values previously defined, as will be seen further on. The selectors 10 and 13 are actuated simultaneously by a decoder 14, connected to a control means 15 effecting the selection of a processing mode, as will be explained later on.

In addition, the decoder 14 controls a circuit 16 which delivers a signal of constant luminance I. This circuit 16 receives at an initiation input 17 the signal denoting the presence of a *d* datum at the input of the comparator 3 equal to the reference R, which is delivered at the output 5 of the comparator 3.

An OR circuit 18 connects the outputs of the multiplier 7 and of the circuit 16 to a digital analogue converter 19. The analogue signal delivered by it is used to control the luminance of the point in the displayed image; the output of the converter 19 will be connected to the cathode of the cathode tube of the graphic visualizing system.

Figure 2:
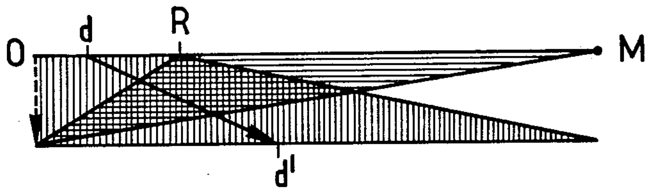
FIG. 2 illustrates the operational principle of the apparatus according to FIG. 1.

The operation of the apparatus according to FIG. 1 is given with reference to the diagram of FIG. 2, which illustrates one of the processing operations performed by this apparatus.

FIG. 2 provides an illustration of the possible variation of the luminance of the *d* data, between the value 0 and the maximum value M; the *d* data being words of 4 bits each, the variation of luminance will range from the level 0 to the level 16. In the provided scale O–M there has been shown the value of the reference R, chosen and memorized in the register 4.

The control means 15 effects the choice of one processing operation from three different operational modes, which are:

treatment of *d* data equal to the reference R,
treatment of *d* data less than the reference R,
treatment of *d* data higher than the reference R.

For the operational mode ensuring the treatment of *d* data equal to the reference R the luminance of the points corresponding to these data assumes a constant value (circuits 16, 18 and 19 in FIG. 1). The other *d* data which differ from R assume the same value, which is nil in this case; the multiplier 7 is inactive. Thus in the image displayed in the visualizing system are reproduced the points of the same luminance, and so the isophotes of the image.

For the operational mode corresponding to the treatment of the data of a value lower than the reference R, the multiplier 7 is active. This multiplier 7 receives the datum *d* from the input register 2 through the controlled selector 10 and the coefficient k1 from the register 11 through the actuated selector 13. This coefficient k1 is so chosen that k1 = M/R. In this case the multiplier 7 expands the zone from O to R over the whole range of luminance values, i.e. from O to M; it is this kind of treatment that is symbolized in FIG. 2, where a datum *d* assumes the value *d'*, such that $d' = d \cdot k1$. The *d* data greater than or equal to R assume the same constant value, which is zero in this case.

In the operational mode relating to the treatment of the *d* data having values greater than R the multiplier is always active. Through the interplay of the controlled selectors 10 and 13 it receives *d*-R and the coefficient k2. The value of this coefficient k2 is such that $$k2 = \frac{M}{M - R}.$$

It is thus the zone from R to M that is dilated over the whole scale of luminance values O-M. The *d* data that are lower than or equal to R assume a constant value, which is zero.

Figure 3:
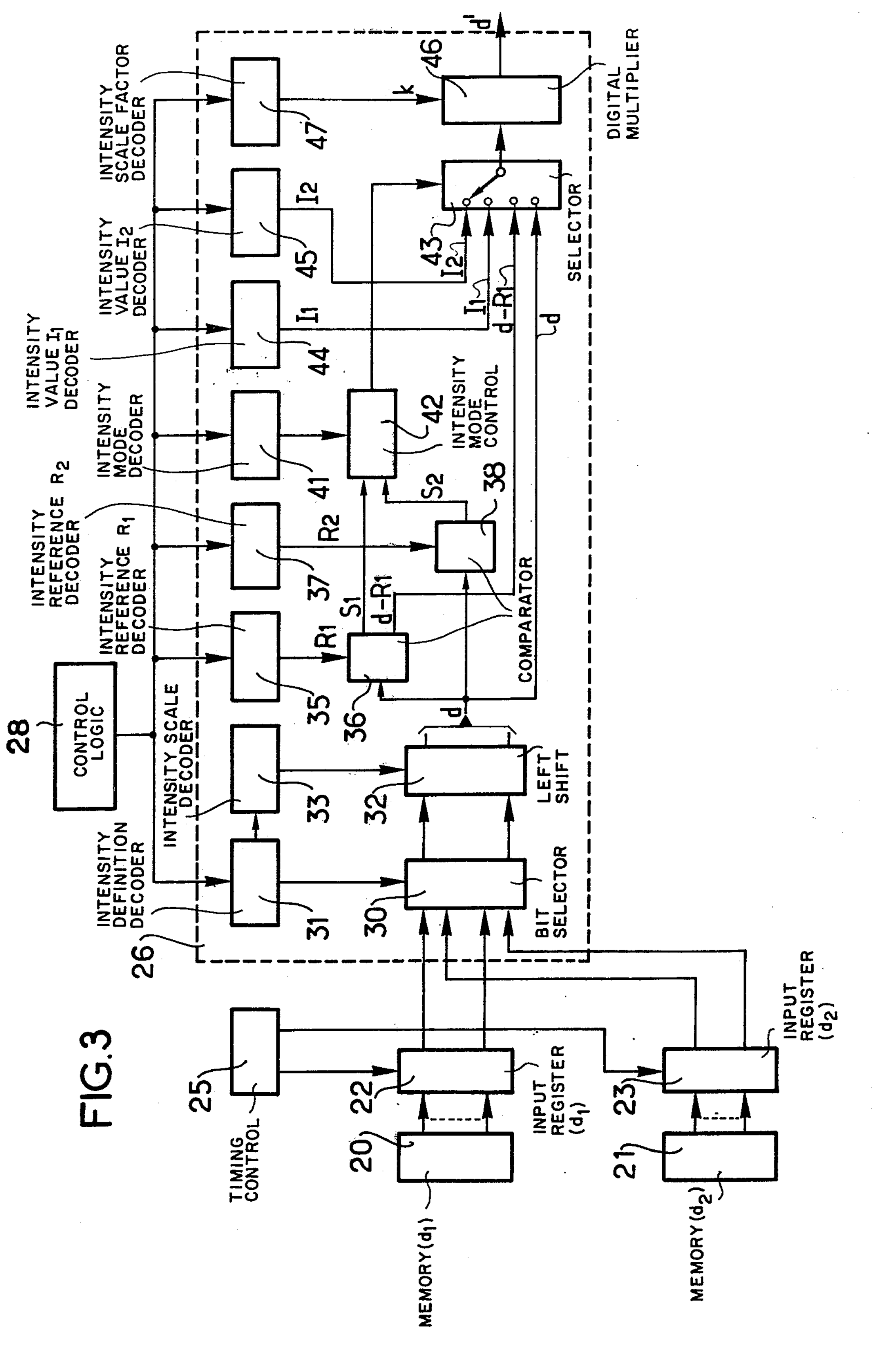
FIG. 3 is a diagrammatic representation of an embodiment which permits a more complex treatment of the information for visual presentation.

FIG. 3 shows an apparatus for processing data relating to the successive points or elements of an image during its maintenance in a visualizing system. This apparatus is applicable to the treatment of two different groups of information data recorded in two memories defining the features of the image to be displayed. As is known in visualizing systems, the information defining the constitution of the image, both from the graphic point of view and that of differentiation between elements, is supplied in numerical form by a pilot originator. The two memories differentiating information *d*1 and *d*2 between the elements in the image are designated 20 and 21, each information item being presented in the form of a word of several bits, for instance 8 bits. A register 22 or 23 ensures the parallel delivery of the bits of successive words coming from the memories 20 and 21 respectively. A time base 25 controls the simultaneous issue of information from the memories 20 and 21.

The apparatus shown in FIG. 3 contains an assembly 26 for the luminance treatment of the information contained in the memories 20 and 21.

A control means 28 of this assembly 26 ensures the monitoring of the predetermined treatment to be carried out. This control means 28 mediates the application to the processing assembly 26 of the instructions in codes form, which determine which of the several possible treatments is to be carried into effect, as will be seen below.

The assembly 26 for the treatment of the information contained in the memories 20 and 21 comprises a circuit 30 which processes the data representing the luminance of the successive elements of the image, each of which corresponds to two information items arriving simultaneously from the registers 22 and 23. This circuit 30 is controlled by a decoder of luminance definition 31, operating by the masking technique defined by the control means 28, as will be seen in more detail with reference to FIG. 4.

Figure 4:
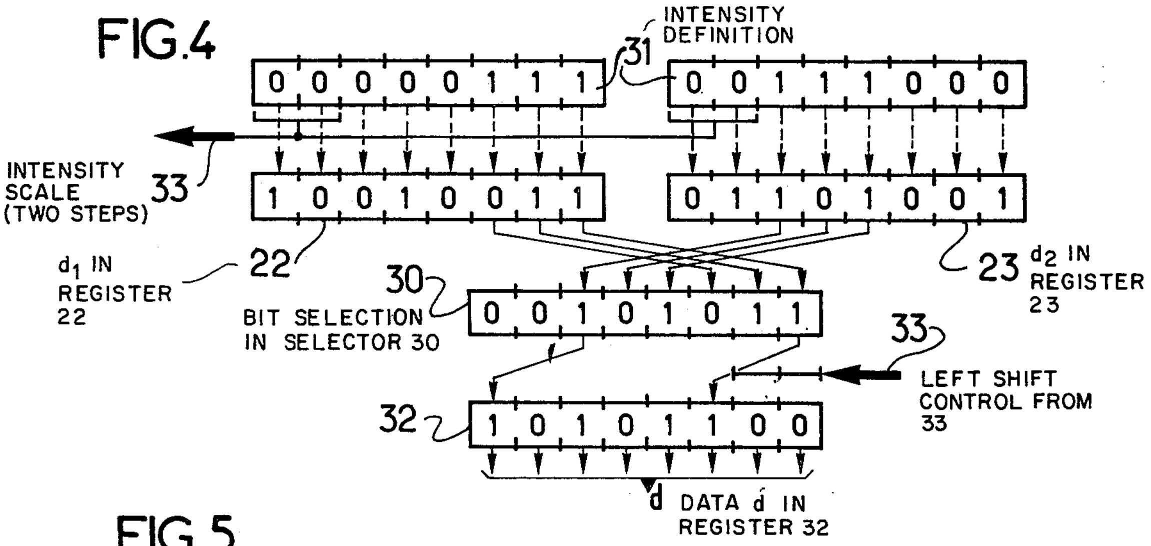
FIG. 4 illustrates the operation of the circuits forming part of the apparatus according to FIG. 3.

The luminance data processed in the circuit 30 are received by a translation register 32, which is controlled by a decoder of the luminance scale 33. The decoder of the luminance scale 33 decodes the luminance scale given in the information processed in the circuit 30 from the decoder of luminance definition 31. The decoder 33 actuates a translation of the bits of each datum received from the register 32, so that each of these data *d* shall be defined on the maximal possible scale of luminance in the visualization assembly. In this way all the data *d* are defined on the same scale O-M at the output of the translation register, as is also illustrated in FIG. 4.

The assembly 26 for the treatment of luminance information works from two reference values of luminance R1 and R2, defined by the control means 28. A first comparator 36 receives on the one hand, the datum *d* from the register 32, and, on the other, the reference value R1 decoded by a decoder 35, which is connected between the comparator 36 and the control means 28. This first comparator 36 delivers at its first output the difference *d*-R1, given in absolute value. At its second output it delivers the sign S1 of this difference *d*-R1. A second comparator 38 also receives the data *d* from the register 32, on the one hand, and the value of the reference R2 decoded by a decoder 37, which is mounted between the control means 28 and the comparator 38, on the other. This comparator 38 delivers the sign S2 of the difference *d*-R2.

A decoder of the mode of treatment in luminance 41, connected to the control means 28, controls a means 42 which selects a definite mode of treatment. This means 42 likewise receives the signals S1 and S2 representing the two differences *d*-R1 and *d*-R2. The means 42 defines the position of the successive *d* data in relation to the references R1 and R2, and, taking into account the defined mode of treatment, actuates a switch or a selector 43. The selector 43 has four inputs where it receives the signals *d*, *d*-R1, a signal I1 and a signal I2 respectively. The two latter signals I1 and I2 are of constant luminance values as defined by the control means 28 and decoded by two decoders 44 and 45 respectively. Thus the selector 43 delivers at its output one of the signals applied at input according to the defined mode of treatment and the position of the data *d* in the scale O-M.

A numerical multiplier 46 receives the signal delivered by the selector 43; it also receives a coefficient of multiplication *k* delivered by the control means 28 and decoded in a decoder of the scale of treatment factor 47. It is the output signal of the assembly 26 that controls the cathode unit during the tracing of the successive segments of the image so defined in luminance.

Figure 6:
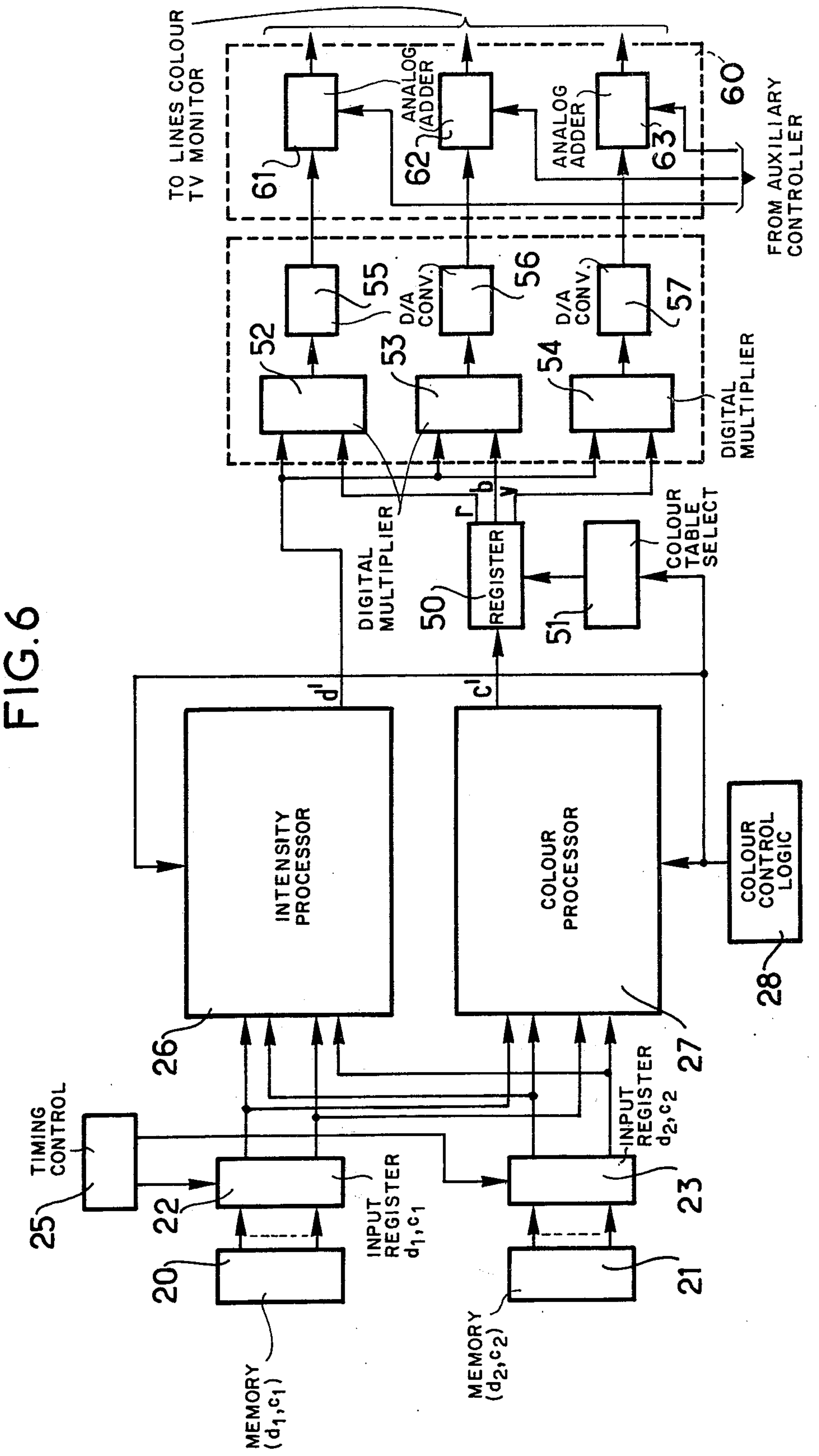
FIG. 6 illustrates another form of the apparatus, derived from FIG. 3.

In its most complex form of embodiment presented in FIG. 6 the apparatus comprises, in addition to the assembly for luminance treatment 26 according to FIG. 3, an assembly for colour treatment 27 of the information $C_1$ and $C_2$ issued by the memories 20 and 21, through the registers 22 and 23. This assembly 27 is similar to the assembly for luminance processing 26, and for this reason its structure is neither illustrated nor described in detail below. It processes from the two groups of information data contained in the memories the data c representing the colour of the successive elements of the image, which are then defined on the maximal scale of colour variation (by means identical with the means 30 and 33 in FIG. 3). It allows to work out the characteristic signals of the positioning of these colour data in relation to the reference data defined in the scale of colour variation O-C by means of the comparator type (circuits such as 35 to 38 in FIG. 3) and to determine the deviation of the successive data from one of the references. It will be understood that the assembly 27 is also controlled by instructions relating to the treatment of the colour data coming from the control means 28. A circuit of commutation of the levels of the colour data *c* assigns to these colour data different levels according to the processing mode that has been determined and according to the positioning of the successive colour data (controls corresponding to the circuits 37, 38, 41 and 42 in FIG. 3). This commutation of levels allows a zone selected from the various defined zones by the reference data to be dilated over the whole range of variation, or to assign to certain defined zones the one or the other of two constant values (circuits identical with the circuits 43 to 47 in FIG. 3).

In FIG. 6 the colour information, i.e. *c'*, coming from the colour treatment assembly 27 is fed into a memory register 50, which memorizes the points of the colour diagram, well known in the art of colour television; the colour diagram provides the analysis of an item of colour information by resolving it into three information signals corresponding to sequences in red, green and blue respectively. This register 50 is controlled by a circuit 51 which selects in the colour diagram points defining the saturation of the data in red, green and blue respectively, and is itself controlled by the means 28. According to the points that have been chosen the memory register 50 delivers three data signals *r*, *b*, *v* contained in the colour information *c'* applied to its input.

Three numerical multipliers 52 to 54 receive the luminance signal delivered by the luminance processing assembly 26. They also receive the aforesaid three signals *r*, *b*, *v* respectively. Thus the three signals *r*, *b*, *v* are modulated in luminance at the output of the multipliers 52 to 54. Three numerical analogue converters 55 to 57 effect their conversion into analogue signals.

These analogue signals are fed into a mixer 60, comprising three additive circuits 61 to 63 capable of receiving corresponding analogue signals from an auxiliary means forming part of the visualizing assembly. This auxiliary means, external to the treatment chain, has not been illustrated; it may be a generator of markers ensuring the designation of an element of an image, making use of a photostyle, and/or any other annexe control circuit forming part of a visualization system. The three signals coming from this mixer 60 determine, after amplification, the instruction for the colour representation of the image in question at a polychromatic cathode tube (of television type) in an assembly for visual presentation of images.

FIG. 4 is given to explain, on the one hand, the functioning of the definition decoder 31 of the luminance data *d* from the information arriving simultaneously from the two registers 22 and 23, and, on the other, the operation of the decoder of the luminance scale which assigns to the data *d* processed in 31 a corresponding value on the pre-determined scale O-M. This FIG. 4 relates to the apparatus of FIG. 3, as well as to the two processing assemblies in FIG. 6.

In response to an actuating instruction delivered by the control means 28, the decoder 31 works out two masking values for the two information items picked up simultaneously from the registers 22 and 23 respectively. These two masks, shown by way of example in FIG. 4, the reference 31 of the decoder delivering them being assigned to them, are binary words of the same length as the length of the information items in the registers 22 and 23. The two information items supplied by the registers 22 and 23 with the references of these registers assigned to them are also illustrated by way of example.

The luminance value processed by the circuit 30 operates by the superposition of one of the masks 31 and the information delivered by the register 22 and the superposition of the other mask 31 and the information delivered by the register 23. The operational principle is as follows:

for every bit O of a mask the corresponding bit 0 or 1 in the information from the register 22 or 23 associated with this mask is rejected, for every bit 1 of a mask the corresponding bit 0 or 1 in the information from the register 22 or 23 associated with this mask is selected, for every bit 1 of the same rank in the two masks a logical OR circuit defines the value of the corresponding bit of the processed datum, for every bit 0 of the same row in the two masks the value of the corresponding bit in the processed datum is 0.

It will be seen from FIG. 4 that for the three bits 1 of the left mask 31, when the bits of the same row in the other mask are 0, the datum worked out in 30 contains the three bits of information from the register 22 of the same row as in that information. The selection of the bits of the datum worked out in 30 is effected in the identical way from the information coming from the register 22, for the bits 1 of the right mask 31 when the bits of the same rank in the other mask are 0. In the two masks 31 the two bits of the greatest weight are at 0, and so in the datum at 30 the two bits of the greatest weight have 0 for value.

The minimal number of consecutive bits of value 0, counted from the topmost row in the two masks 33 (here this number is equal to two), determines the deviation number of the datum $d$ needed to define its value in the maximal scale of luminance O-M. This deviation corresponds to the instruction 33 given by the decoder 33 and is indicated by the arrows connecting the datum in 30 to that in 32.

This FIG. 4 is given for the structure of the luminance date $d$; the same principle is operative in forming the colour data $c$.

Figure 5:
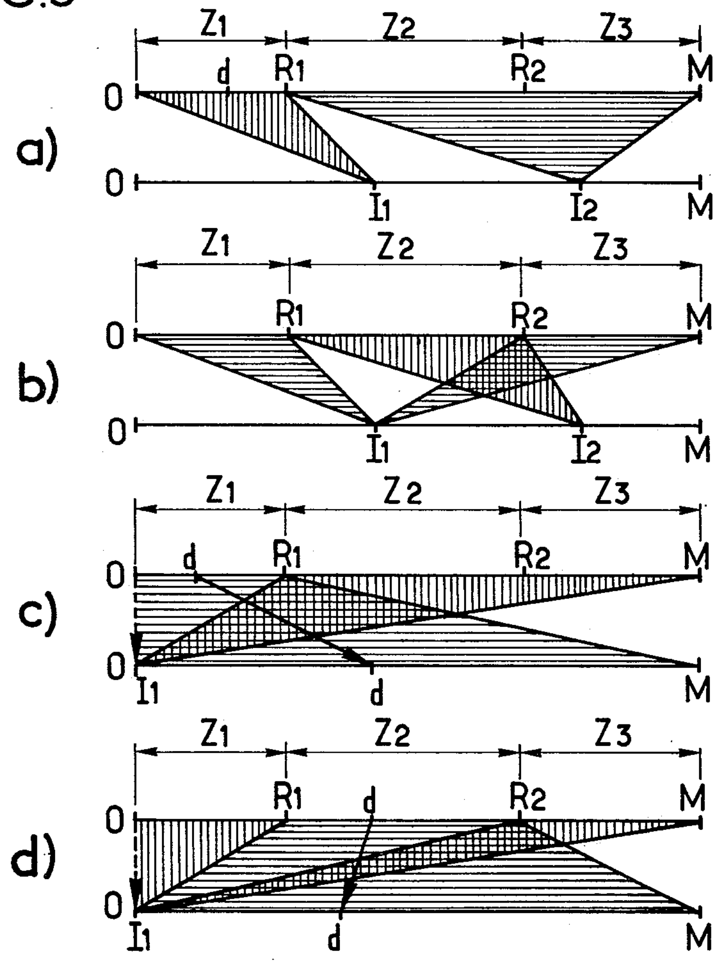
FIG. 5 illustrates the operational principle of the apparatus according to FIG. 3.

The treatment modes from $a$ to $d$ effected by the luminance processing assembly are illustrated in FIG. 5. The maximal scale of luminance O-M is shown there. For the possible processing modes the control means defines in the scale O-M two reference values of luminance R1 and R2. which divide the scale O-M into zones Z1 to Z3; it also defines in the scale O-M a constant luminance value I1 or I2 or the two values I1 and I2.

With reference to FIGS. 3 and 6, the control means 28 in the apparatus delivers, accordingly:

selection actuating signals for the luminance data $d$ and/or colour $c$, instruction signals for defining references in the scale O-M and/or the scale O-C, instruction signals for defining constant values of luminance and/or colour, instruction signals for multiplication factors k for dilating a selected zone in the whole of the corresponding scale, and an instruction signal for selecting colour cards (FIG. 6).

Thus this control means 28 allows to define the following operational modes for each treatment assembly, for instance, the assembly 26 — an "all or nothing" operational mode starting from a single reference; say, R1. In this case, schematized at a in FIG. 5, the constant value I1 is assigned to any datum $d$ having a value below that of the reference R1 ($d$<R1); the constant value I2 is assigned to every datum $d$ higher than or equal to R1 ($d \geq$ R1), an operational mode all or nothing starting from two references R1 and R2. In this case, schematized at b in FIG. 5, to every datum $d$ lower than the reference R1 or higher than the reference R2 ($d$<R1 or $d$>R2) is assigned the constant value I1; the constant value I2 is attributed to any datum $d$ contained between the references R1 and R2 or equal to the references R1 and R2 (R1 $\leq d \leq$ R2). In this case, if the references R1 and R2 are equal the treatment assembly allows to represent the isophote curves of the image, an operational mode called "zone extension" starting from a single reference, say R1. In this case, schematized at $c$ in FIG. 5, any datum $d$ lower than R1 ($d$<R1) is multiplied by a coefficient $k$ of a previously defined value, $k$ = M/R1. This treatment corresponds to dilating the zone Z1 contained between O and R1 over the maximal scale O to M. In this mode of operation any datum $d$ greater than or equal to R1 ($d \geq$ R1) has assigned to it a constant luminance value I1, which is chosen here as O. Alternatively, according to the same mode, all the zone Z2 contained between R1 and M may be dilated on the scale O-M and, contrariwise, a constant value of luminance I1 is assigned to the zone Z1, a mode of operation called "zone extension" starting from two references R1 and R2. In this case, schematized at $d$ in FIG. 5, the data $d$ lying between the two references R1 and R2 (R1<$d$<R2) are dilated over the whole scale O-M, whereas the data lower than R1 or higher than R2 are defined by the same constant value, say I1, which is here zero. To any datum $d$ contained between the references R1 and R2 is assigned the value of the reference R1, the result of this operation being then multiplied into a coefficient k of the value $$k = \frac{M}{R2 - R1}.$$

The colour treatment assembly 27 has the same characteristics as the luminance treatment assembly. The alternative operational modes are identical; they are not particularly described. The information delivered at the output of this assembly 27 defines the colour of an element in the displayed image. In order to represent an element of the image, this colour information is resolved into red, blue and green colour signals.

A mixture of the two treatments in luminance and colour is effected, the luminance value coming from the treatment assembly 26 acting as a multiplication factor upon the colour signals $r$, $b$, $v$ obtained from the treatment assembly 27 and from the selected colour card at 51.

The apparatus according to the invention is particularly suitable for visualizing information from measuring satellites. This information is received in the ordinator which pilots the visualizing system and are entered in numerical form in the maintenance memories 20 and 21. The information then defines a global image, corresponding, for instance, to measurements through different atmospheric layers. In this case the information obtained from the satellite consists in data from the infrared range and data from the visual range. The combination of these two groups of data, without treatment, defines the global image. The masking technique allows to obtain from these two groups of data other images, referred to as partial, whose features are all contained in the global image, but from which certain other features of the global image are eliminated. If, then, the global image is defined as the "superposition" of partial images corresponding to different atmospheric layers, the masking technique allows to extract from the global image, which is in practice the only one defined by the two groups of data in the memories 20 and 21, these partial images to set in relief some part of the features entering into the global image.

Moreover, the treatment carried out both on the luminance data and the processed colour data (according to FIG. 6) for visualizing a partial image corresponds to bringing into supplementary relief certain characteristics of the partial image. This bringing into relief is then effected either by assigning fixed values of luminance and/or of colour according to the predetermined zones of the scales O-M of luminance and O-C of colour, or by dilating over the whole scale O-M and/or the whole scale O-C the luminance and the colour data contained for each of them in a previously defined zone of the corresponding scale.

The definition of partial images, then the examination of the features of a partial image by dilating a zone in the data scales corresponds to a study "in depth" of the features of the global image, and so to an examination of the features of the partial image "through a magnifier". Owing to the two treatments of the information data, in respect of colour and of luminance, the differentiation of the characteristics is exploited to the maximum extent: the features of a partial image giving rise to patterns in any one colour are differentiated from one another by varying the luminance.

The form of embodiment given in FIG. 1 defines the principle employed by the invention. The form of embodiment given in FIG. 3 corresponds to a complex treatment in luminance of the information defining the totality of features of an image. The form of embodiment given in FIG. 6 corresponds to a complex treatment of the information in luminance and in colour. These forms of embodiment have been chosen by way of example. It will be understood that they may be subject to modification in detail and/or replacement of some means by other technically equivalent means without exceeding the scope of the present invention.

What is claimed is:

1. Apparatus for the treatment of numerical information representative of successive elements of an image to be displayed on a screen of a cathode unit of a visual display system, the information being recorded in a memory of the visual display system and defining data characteristic of the aspect of the successive elements of the image applied to the cathode unit in relation to the scale of said elements, said apparatus comprising a first circuit including a comparator connected to the memory to receive said data, a first register connected to said first circuit for supplying the same with at least one reference data defining different zones on a scale defining variations of the values of the data, said first circuit delivering an output signal characteristic of one of the zones according to the value of each bit of data with respect to the reference value, a multiplier circuit connected to and controlled by the output signal of the said comparator, a first control switch connected to said multiplier circuit, second registers memorizing different predetermined multiplication coefficients connected to said first control switch such that the multiplier circuit is capable, respectively, of expanding different zones of the data over the entire scale of values, a second control switch connected to said multiplier circuit, said second control switch having one input connected directly to the memory, a subtractor connected to said memory and said first circuit and capable of forming the difference between the value of each bit of the data and the value of each reference, said second control switch having a second input connected to said subtractor and a third register coupled to said comparator and memorizing at least one constant data value defined in the scale of values of the data and controlled by the output signal of the comparator, the output of the said third register and the output of the multiplier circuit forming the output of the treatment apparatus and comprising, additionally, a control circuit for one mode of treatment of the data selected from a number of treatment modes defined from the selection of each reference data of each constant value data and from a zone of the said scale, said control circuit being coupled to said first and third registers and to said switches to modify the values of the data delivered at the output of the treatment apparatus, and thus applied to the said cathode unit according to the selected mode of treatment.

2. Apparatus according to claim 1 in which said memory is constituted by two memory blocks containing a first group of data and a second group of data of the same type and both related to the successive elements of the same image, said apparatus further comprising a selection circuit connected to the output of the memory for a single group of data from the said two groups and controlled by a selection mode of data defined and applied to the control circuit by a decoding circuit of the said selection mode connected to the control circuit and determining the positions of the bits to be respectively selected in each pair of data of the said groups of data to record the selected bits in each pair of data.

3. Apparatus according to claim 2 comprising a transcoding circuit of data of said single group in the defined scale of the variations of the data connected to the said selection circuit to receive the data from the single formed group and controlled from the decoding circuit of the said selection mode of the bits through a decoding circuit of the scale of these selected data defined by the maximum weight of the bits to be selected in one and the other of two groups of data with respect to the said defined scale, said transcoding circuit effecting distribution of the said selected bits from a number of given ranges by the spacing between the maximum weight of these selected data and the maximum weight of the coded data in the said defined scale.

* * * * *